Figure 7:
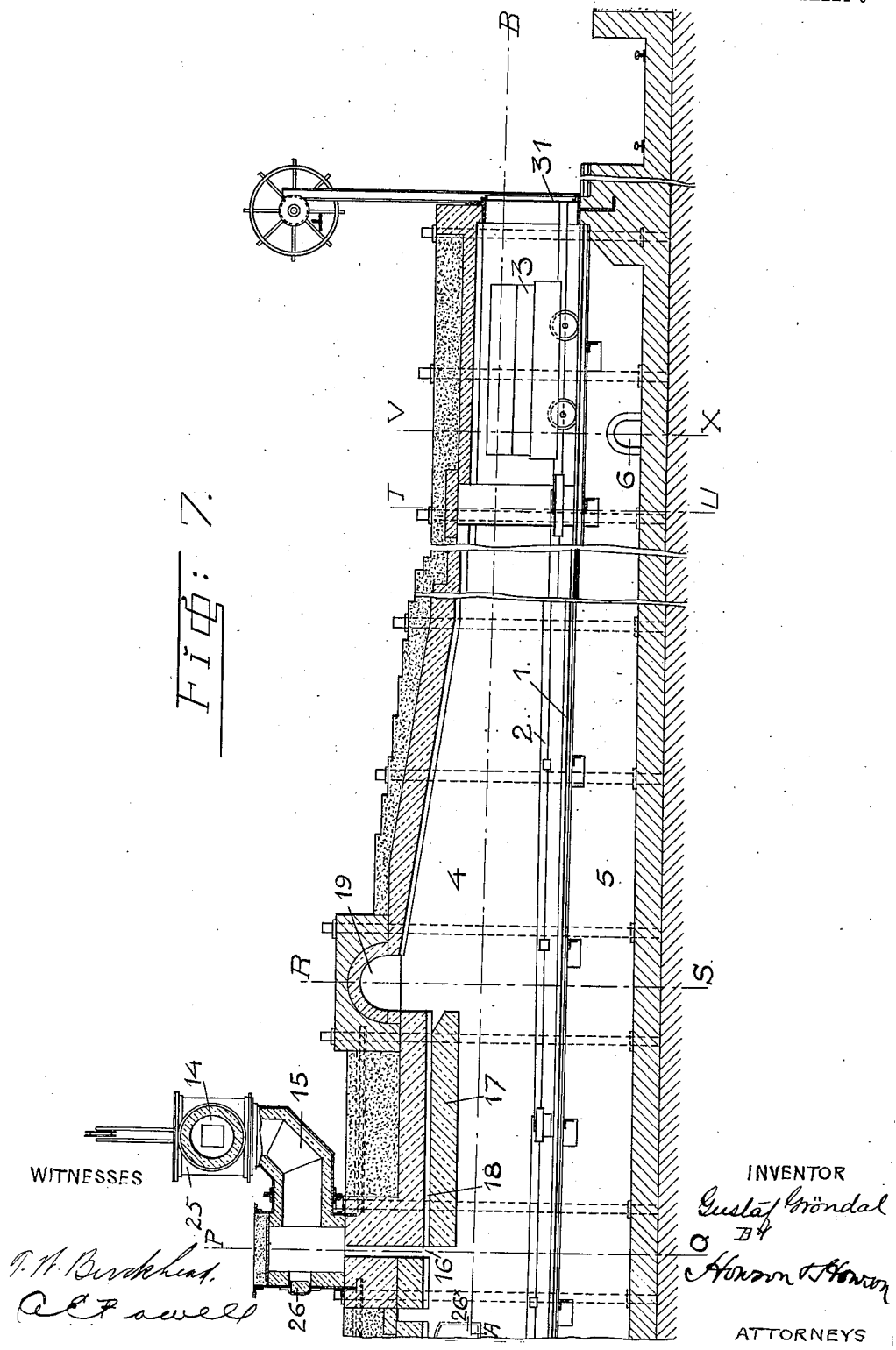

No. 876,712. PATENTED JAN. 14, 1908.
G. GRÖNDAL.
METHOD OF AND MEANS FOR UTILIZING THE HEAT IN FURNACES OF THE CHANNEL TYPE.
APPLICATION FILED OCT. 14, 1905.
10 SHEETS—SHEET 1.
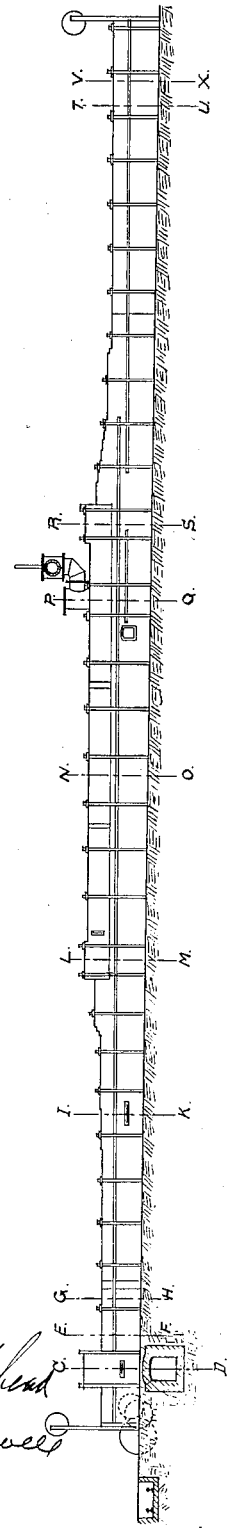
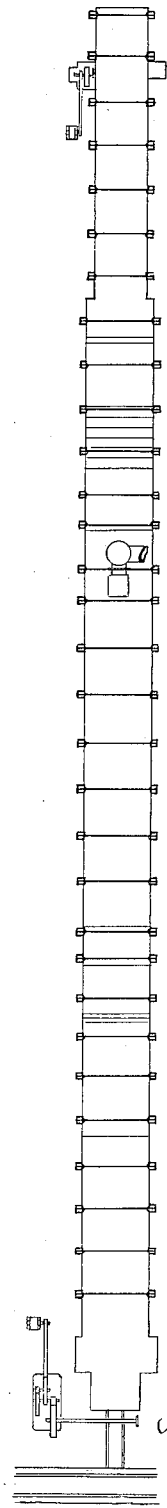
WITNESSES
INVENTOR
Gustaf Gröndal
BY
ATTORNEYS

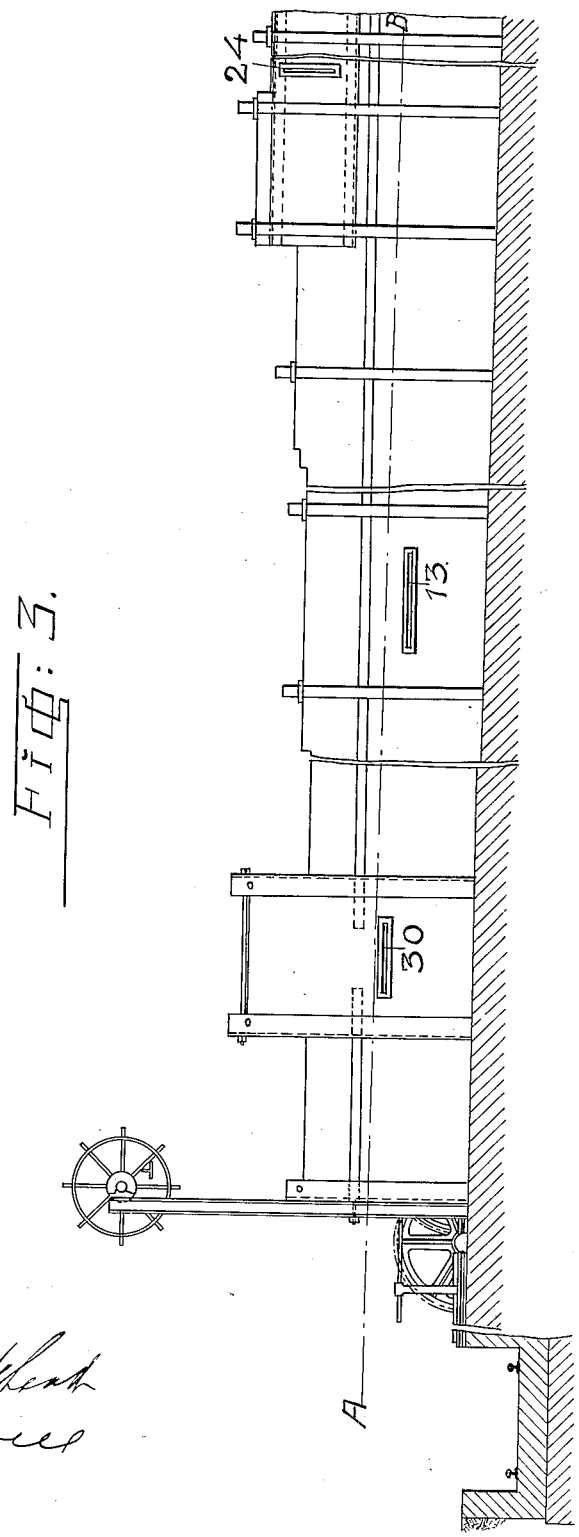

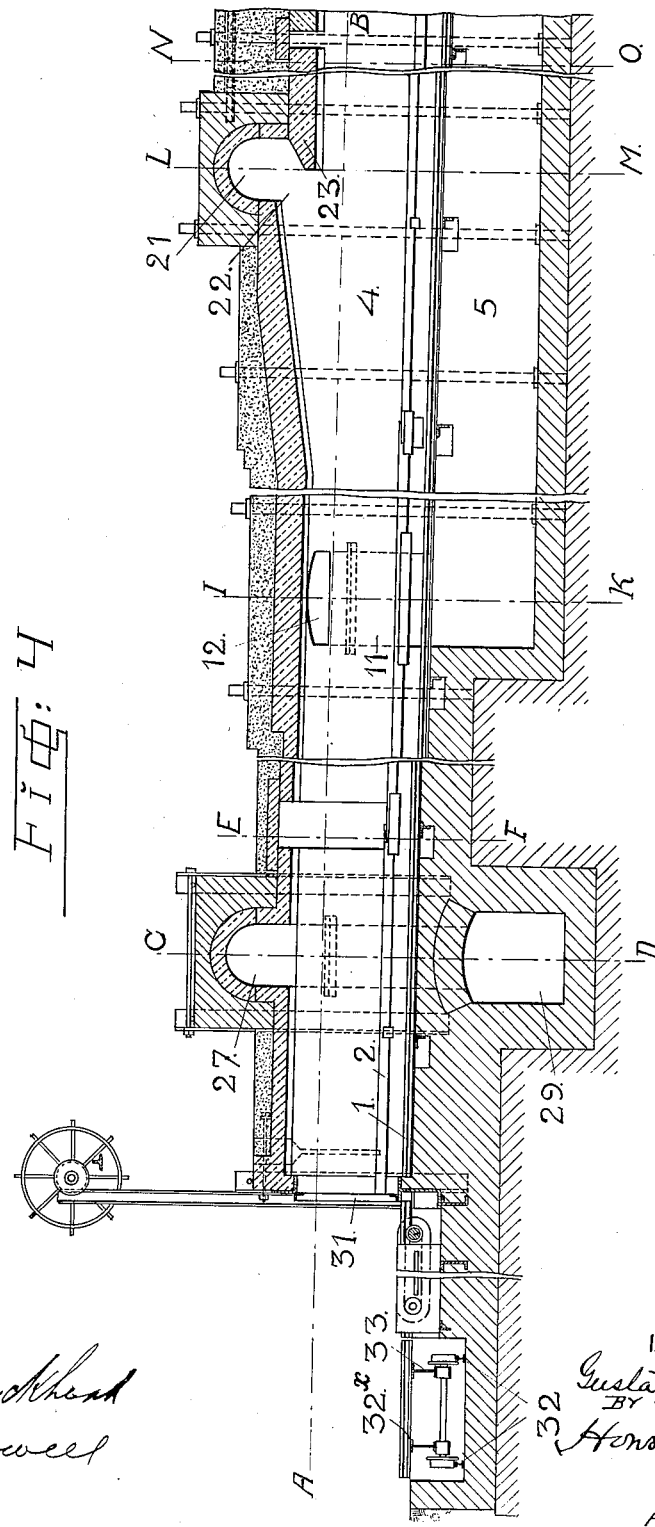

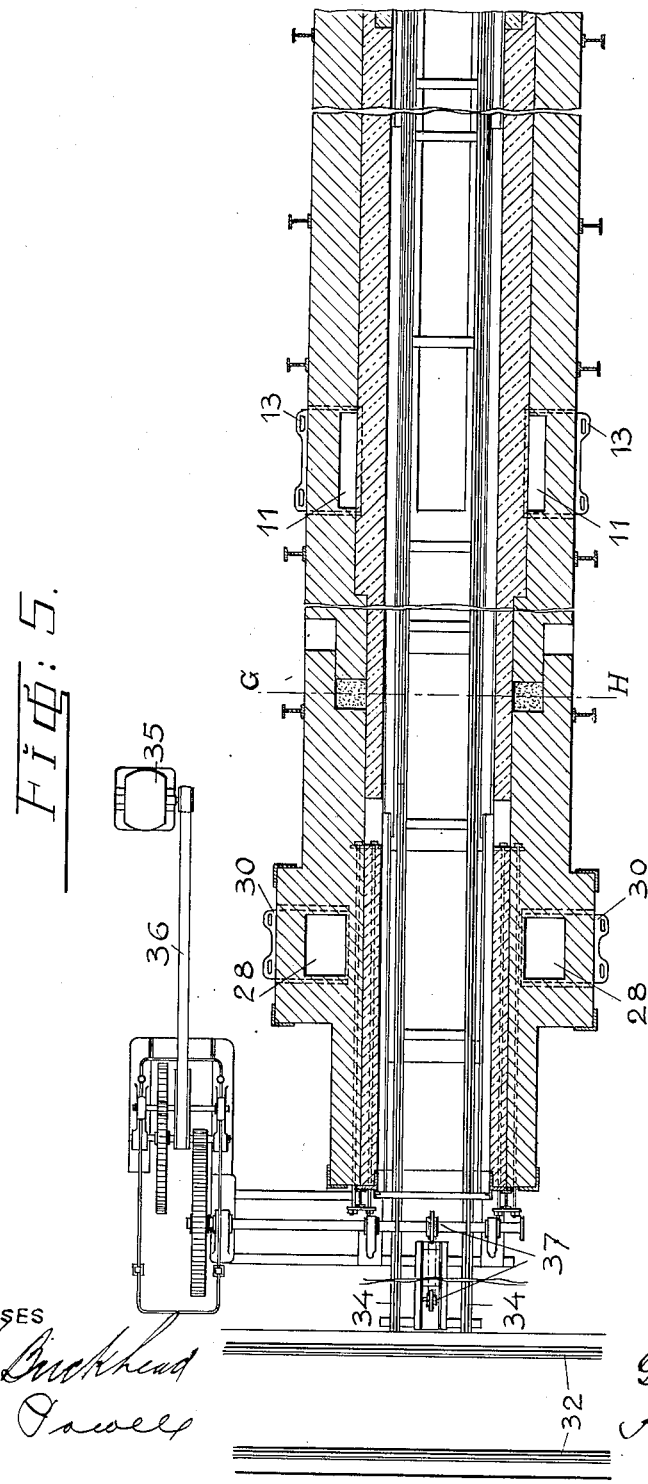

No. 876,712. PATENTED JAN. 14, 1908.
G. GRÖNDAL.
METHOD OF AND MEANS FOR UTILIZING THE HEAT IN FURNACES OF THE CHANNEL TYPE.
APPLICATION FILED OCT. 14, 1905.
10 SHEETS—SHEET 5.
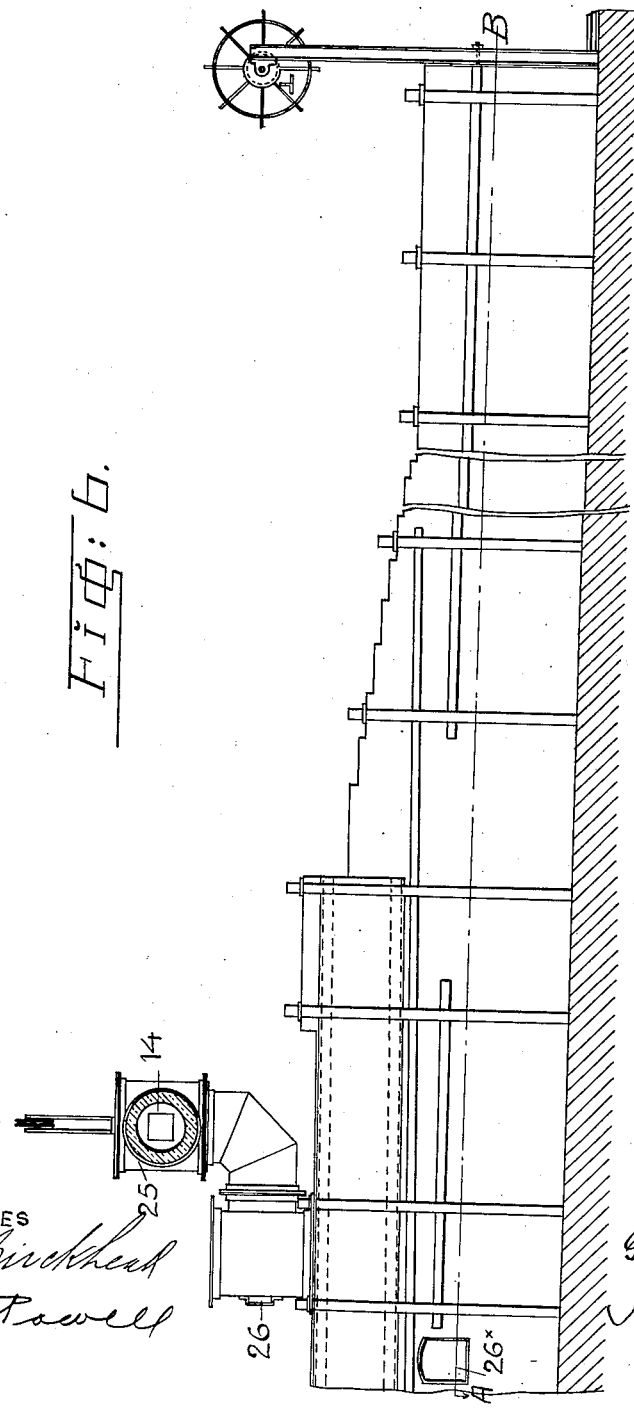
Fig: 6.
WITNESSES
INVENTOR
Gustaf Gröndal
BY
ATTORNEYS No. 876,712. PATENTED JAN. 14, 1908.
G. GRÖNDAL.
METHOD OF AND MEANS FOR UTILIZING THE HEAT IN FURNACES
OF THE CHANNEL TYPE.
APPLICATION FILED OCT. 14, 1905.
10 SHEETS—SHEET 6

WITNESSES
INVENTOR
Gustaf Gröndal
BY
ATTORNEYS

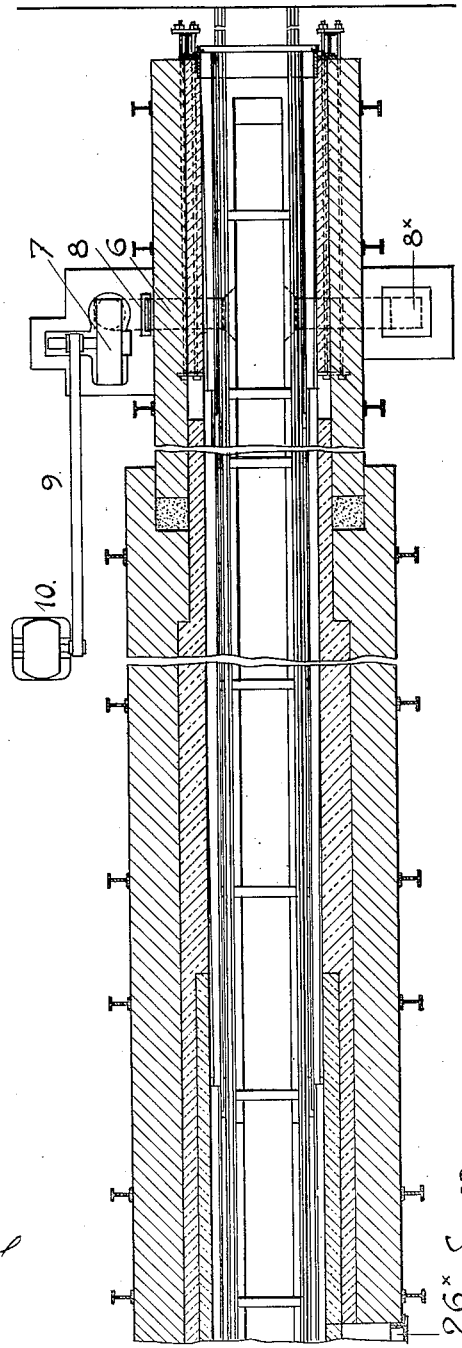

No. 876,712. PATENTED JAN. 14, 1908.
G. GRÖNDAL.
METHOD OF AND MEANS FOR UTILIZING THE HEAT IN FURNACES OF THE CHANNEL TYPE.
APPLICATION FILED OCT. 14, 1905.
10 SHEETS—SHEET 8.
Fig: 9.
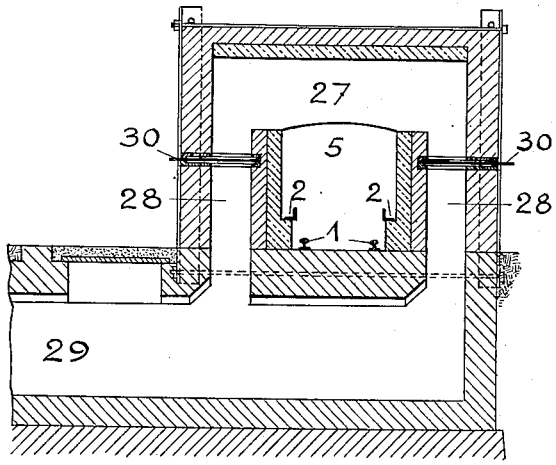
SECTION C-D.
Fig: 10.
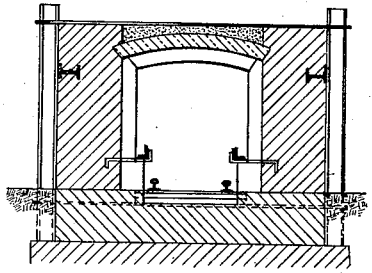
SECTION E-F.
Fig: 11.
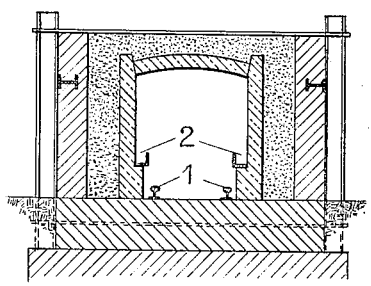
SECTION G-H.
Fig: 12.
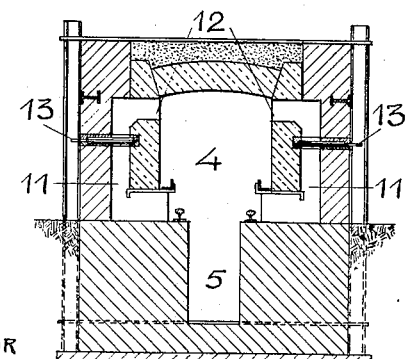
SECTION I-K.
WITNESSES
INVENTOR
Gustaf Gröndal
BY
ATTORNEYS No. 876,712. PATENTED JAN. 14, 1908.
G. GRÖNDAL.
METHOD OF AND MEANS FOR UTILIZING THE HEAT IN FURNACES
OF THE CHANNEL TYPE.
APPLICATION FILED OCT. 14, 1905.
10 SHEETS—SHEET 9.
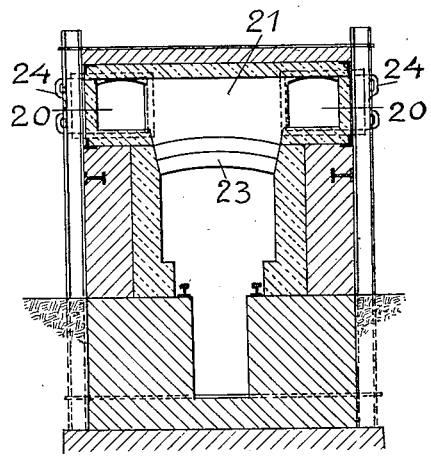
Fig: 13.
SECTION L-M.
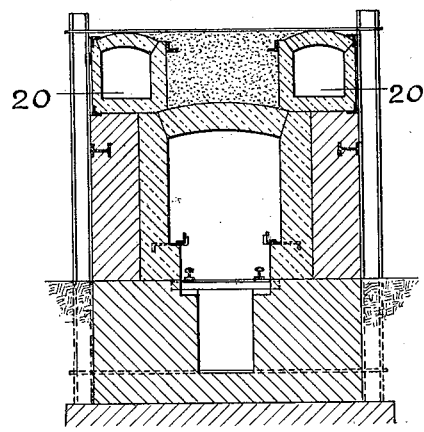
Fig: 14.
SECTION N-O.
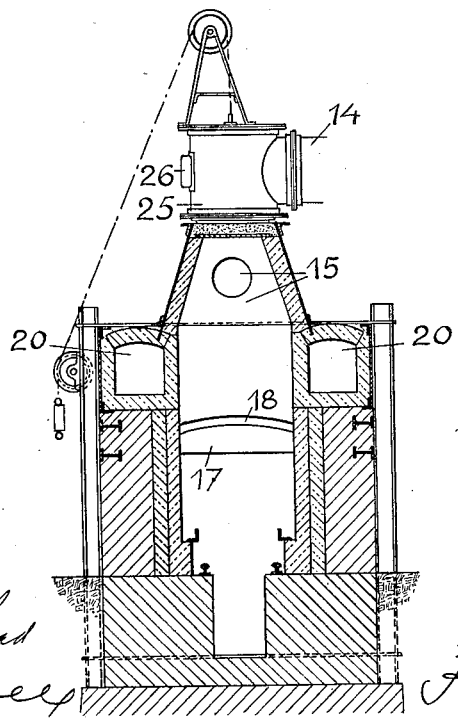
Fig: 15.
SECTION P-Q.
WITNESSES
INVENTOR
Gustaf Gröndal
BY
ATTORNEYS No. 876,712. PATENTED JAN. 14, 1908.
G. GRÖNDAL.
METHOD OF AND MEANS FOR UTILIZING THE HEAT IN FURNACES OF THE CHANNEL TYPE.
APPLICATION FILED OCT. 14, 1905.
10 SHEETS—SHEET 10.
Fig: 16.
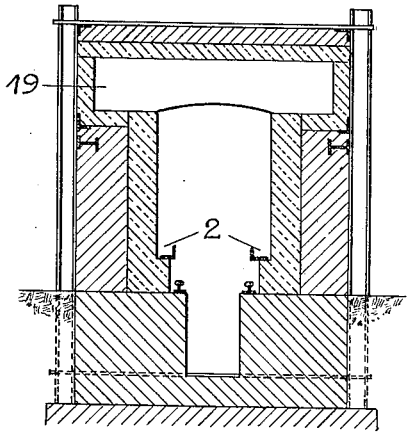
SECTION R-S.
Fig: 17.
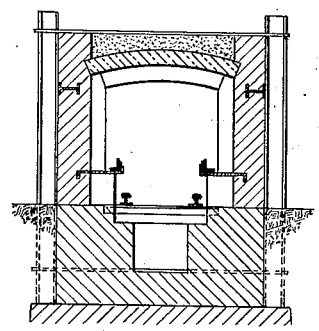
SECTION T-U.
Fig: 18.
SECTION V-X
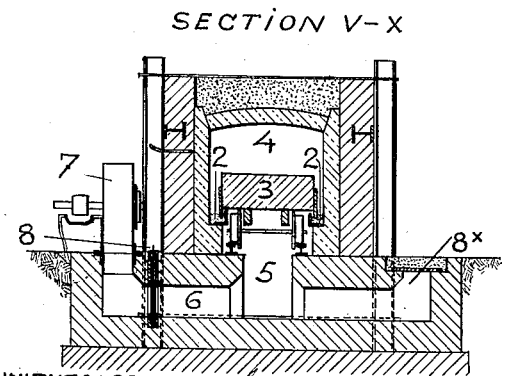
Fig 19.
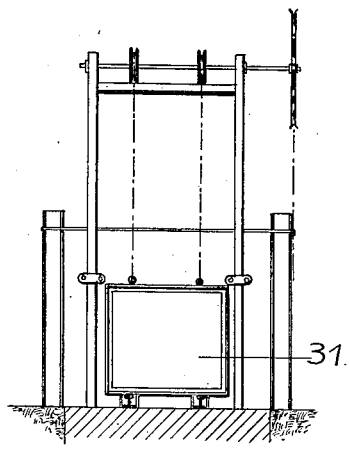
WITNESSES
O. W. Birckhurd
A. E. Powell
INVENTOR
Gustaf Gröndal
BY
Henson W. Henson
ATTORNEYS

UNITED STATES PATENT OFFICE.

GUSTAF GRÖNDAL, OF DJURSHOLM, SWEDEN, ASSIGNOR TO METALLURGISKA AKTIE-BOLAGET, OF STOCKHOLM, SWEDEN, A CORPORATION OF SWEDEN.

METHOD OF AND MEANS FOR UTILIZING THE HEAT IN FURNACES OF THE CHANNEL TYPE.

No. 876,712.   Specification of Letters Patent.   Patented Jan. 14, 1908.

Application filed October 14, 1905. Serial No. 282,765.

*To all whom it may concern:*

Be it known that I, GUSTAF GRÖNDAL, a subject of the King of Sweden and Norway, and resident of Djursholm, Sweden, have invented a new and useful Improved Method of and Means for Utilizing the Heat in Furnaces of the Channel Type, of which the following is a specification.

This invention has for its object to utilize, in a better manner than hitherto the heat in furnaces of the kind that comprises a preliminary heating compartment and a cooling compartment and a burning or baking chamber situated between these compartments and into which burning or baking chamber the fuel is fed and in which chamber it is consumed, and the goods or articles being placed on movable supports are passed through the furnace intermittingly. The invention is characterized thereby that a larger quantity of air than necessary for the complete combustion of the fuel is fed into the furnace at the delivery end and that the amount of the air not necessary for the combustion, being heated by contact with the burned goods or articles in the cooling compartment, is conducted past the burning chamber and introduced again into the furnace at a point in the preliminary heating compartment where the temperature of the combustion products from the burning chamber is practically equal to the temperature of the air reintroduced into the furnace. This air mingles with the combustion products and transmits its heat to the goods or articles in the preliminary heating compartment, thereby increasing their temperature. A large quantity of air may also be fed beneath the heated supports, carrying the burned goods or articles, and the supports be cooled down to any desired temperature. This air is thereby heated and is afterwards led into the preliminary heating compartment in order also to utilize this heat, which is transmitted to the goods in the preliminary heating compartment.

In the accompanying drawings there is represented, by way of an example only, a continuously working channel furnace with gas firing particularly intended for burning ore briquets, and provided with the features necessary for executing the purposes of the invention.

Figures 1 and 2 represent the complete furnace in a side view and from above. Figs. 3—19 are views of the furnace on a larger scale with parts broken away to save room on the drawings. Figs. 3, 4 and 5 represent the greater part of the preliminary heating compartment of the furnace respectively in a side view and in a vertical longitudinal section through the center of the furnace and in a horizontal section on line A—B of Figs. 3 and 4. Figs. 6, 7 and 8 represent respectively the corresponding view and sections of parts of the burning chamber and cooling compartments. Figs. 9 to 18 are cross sections through the furnace on lines C—D, E—F, G—H, I—K, L—M, N—O, P—Q, R—S, T—U, and V—X respectively of Figs. 1, 4 and 7. Fig. 19 is an end view of the delivery end of the furnace.

For facilitating the draft the furnace is built sloping upwards towards the chimney. The furnace is provided with rails 1, 1 slightly inclined in the same direction, *i. e.* from the inlet end towards the delivery end for facilitating the forward movement of the loaded trucks along the furnace. 2, 2 are troughs along both sides of the furnace, intended to be filled with sand. The trucks, one of which is indicated by 3 in Figs. 7 and 18, have the end faces of their bottoms of a suitable form to make a practically tight joint between two trucks standing end to end, and they are provided at their sides with iron plates which project into the sand troughs 2. By means of the tightly closing bottoms of the trucks and the sand traps the furnace thus becomes divided in two separate chambers one above the other, namely the upper chamber 4, the furnace chamber proper, and the lower one 5, the channel under the bottoms of the trucks through which a portion of the air is led. This channel 5 communicates through a transverse channel 6 with an air inlet through which air is forced by means of a fan 7. 8 is a regulating damper. $8^\times$ is a man-hole. The fan which is shown to be driven by a belt 9 from a dynamo 10 may feed air to several furnaces, if desired. The channel 5 communicates at the end with the furnace chamber 4 by means of side-channels 11, 11, which open through the holes 12, 12. In the channels 11, 11 there are provided regulating dampers 13, 13.

14 is a tube or main conduit supplying the combustible gas, for instance from a gas producer. From this tube 14 issues a branch 15 that leads to the furnace and opens through an oblong aperture 16 in the roof of the furnace, that is somewhat higher at this point. Behind this aperture 16 an arch 17 of the cross section shown in Fig. 7 is built affording a narrow flue 18 which opens at the aperture 16. Behind the arch 17 the vault of the furnace has an opening leading into a discharge conduit 19 for the superfluous air. This conduit 19 opens into two channels 20 extending along the furnace, which end in a transverse channel 21 communicating with the furnace chamber 4 by means of openings 22, Fig. 4, in the roof of the furnace. Under this opening 22 a portion 23 of the vault of the furnace projects in the manner shown for facilitating the mixture of the air with the combustion products coming from the burning chamber. The channels 20 are provided with dampers 24 capable of being operated from the outside of the furnace. 25, Fig. 7, is a valve casing for a valve (not shown) between the gas tube 14 and the conduit 15. 26, 26 are cleaning doors. 26$^\times$ is the door for tending a fire when necessary.

At the inlet end of the furnace or at the front end of the preliminary heating compartment there is provided a discharge passage 27 in the roof of the furnace. This discharge 27 communicates by means of channels 28, Fig. 9, with the flue 29 leading to the chimney. 30, 30 are regulating dampers in the channels 28.

The ends of the furnace are closed by doors 31 capable of being raised and lowered. 32, Figs. 4 and 5, is a railroad on which the loaded truck is carried to the furnace on a carriage 33 provided with rails 32$^\times$. From this carriage the truck is carried on the track 34 lying in a line with the track in the furnace. 35, Fig. 5, is a dynamo driving by means of belt 36 and gearing a conveyer 37 by which the loaded truck is pushed into the furnace and pushes the whole line of trucks in the furnace forward directly after a truck has been removed from the cooling compartment.

The furnace operates in the manner known for such furnaces. By being able to force a larger supply of air into the cooling compartment than is required for the combustion of the fuel the burned goods are cooled more effectively than could be done hitherto in similar furnaces, and the heat then absorbed by this portion of the air is delivered to the goods in the preliminary heating compartment which thereby become heated to a greater extent before entering into the burning chamber than could be effected hitherto. This preliminary heating is still more increased by the large quantity of air that is led under the bottoms of the trucks in the cooling and heating compartments of the furnace and after being heated is introduced into the preliminary heating compartment.

When introducing a loaded truck into the furnace at the end for the preliminary heating, thereby pushing the line of trucks as a whole towards the end for the cooling so that one truck is expelled there and removed, the first truck of the line remaining in the furnace should have the position occupied by the truck 3 in Fig. 7 or thereabout. It is thereby rendered possible that a portion of the air from the fan 7 passes by the fore end of this truck and rises up into the furnace chamber 4 while another portion of the air passes through the channel 5. By means of the dampers 13, 13, Fig. 12, the air may be distributed at will in the two chambers 4 and 5. By means of the dampers 24, 24, Fig. 13, it may be determined how large a portion of the air is to be led past the combustion place and how large a portion of the air is to be led into the combustion place. In normal working an equal pressure reigns in the two chambers 4 and 5, and consequently the currents of air passing along said chambers have no tendency to pass over from the channel 5 to the chamber 4 or the converse.

In starting the furnace a fire may be lighted at the gas inlet through the door 26$^\times$, Fig. 7.

As mentioned above, the furnace as shown on the drawings only serves as an example and the dimensions and detail may be varied according to circumstances without departing from the invention. For instance the fan may be dispensed with and only the draft through the chimney employed.

I claim:—

1. Method of utilizing the heat in furnaces having a preliminary heating compartment, a cooling compartment and an intermediate burning chamber, in which latter the fuel is fed and burned, and through which compartments and chamber the goods or articles are fed intermittently, said method consisting in feeding air over the goods in the cooling compartment to, and using it for combustion in the burning chamber, said air being in larger quantity than is necessary for the combustion of the fuel required for producing the necessary heat in the burning chamber, and leading the superfluous quantity of air heated in the cooling compartment past the burning chamber and introducing it together with the products of combustion from the burning chamber into the preliminary heating compartment to there deliver its heat to the goods.

2. A channel furnace with gas firing for burning ore briquets and the like, consisting of a preliminary heating compartment, a cooling compartment and an intermediate burning chamber, in which latter the fuel is fed and burned, and trucks passing through said compartments and chamber and on which the goods or articles are placed, means for introducing air through the cooling chamber into the burning chamber, and in larger quantities than is necessary for use in the burning chamber, and said furnace being provided with a controllable conduit for that portion of the air not necessary for the combustion of the gas, the said conduit being made to issue from the cooling compartment and being led past the burning chamber and opening at a suitable point into the preliminary heating compartment of the furnace together with a controllable conduit leading from the furnace and opening into the preliminary heating channel, whereby the products of combustion mingle with the surplus air from the cooling chamber to effect the preliminary heating desired.

In testimony whereof I have signed my name to this specification, in the presence of two subscribing witnesses.

GUSTAF GRÖNDAL.

Witnesses:
FREDRIK L. ENQUIST,
HJ. FETTURSTRÖM.